UNITED STATES PATENT OFFICE.

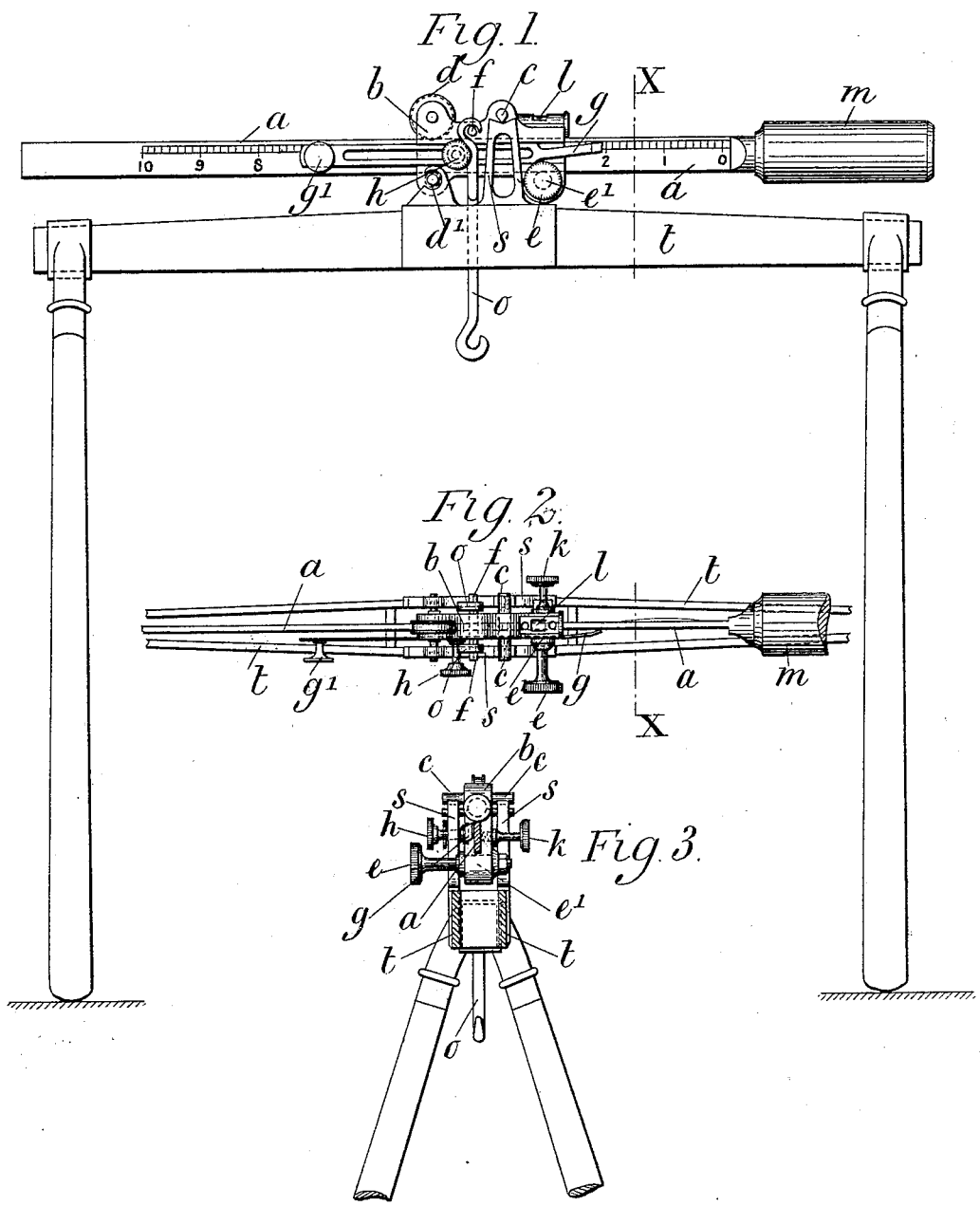

ROBERT NESBIT COGHLAN, OF KARACHI, INDIA.

WEIGHING APPARATUS.

SPECIFICATION forming part of Letters Patent No. 520,301, dated May 22, 1894.

Application filed December 11, 1893. Serial No. 493,328. (No model.) Patented in England August 22, 1892, No. 15,092, and in India September 16, 1892, No. 191.

*To all whom it may concern:*

Be it known that I, ROBERT NESBIT COGHLAN, a citizen of England, residing at Karachi, Bombay Presidency, India, have invented a new or Improved Weighing Apparatus, (for which Letters Patent have been obtained in Great Britain, No. 15,092, dated August 22, 1892, and in India, dated September 16, 1892, No. 191,) of which the following is a specification.

My invention relates to a weighing apparatus of the steelyard class, which is compact and simple and can be rapidly mounted for use, or dismounted and packed in small bulk for transport, along with a trestle for its support, when necessary.

Figure 1 of the accompanying drawings is a side view of weighing apparatus according to my invention supported on a portable trestle. Fig. 2 is a plan and Fig. 3 is a section on the line X X of Figs. 1 and 2.

$a$ is a beam graduated along the side, and loaded at one end with a weight $m$. The beam $a$ is fitted to slide freely through a holder $b$ between two rollers $d$ $d'$ and over a cylindrical shaft, spindle, or roller $e'$ which can be turned in either direction by hand applied to the milled head $e$, thus causing the beam $a$ to travel to right or left as desired. The holder $b$ has a pair of knife edge pivots $c$ projecting from the upper parts of its sides and resting on the standard or support $s$ which is carried on the double bars of a trestle $t$. From a pair of inverted knife edges $f$ carried by the holder $b$, a forked hook $o$ is suspended to carry the articles to be weighed, or a tray or receptacle holding them. A gage $g$ having its end bent to act as an index, is fitted to slide along a groove in the side of the holder $b$. It can be moved by hand applied to the button $g'$ and can be clamped in position by a setting screw $h$. At the back of the holder $b$ there is a setting screw $k$ by which the beam $a$ can be clamped to the holder $b$. On the top of the holder is a spirit level $l$.

Weighing with the apparatus is effected in the following manner: First, while the hook $o$ is suspended, or with it the empty scale or receptacle which it carries, the beam is moved lengthwise in the rocking-holder by frictional contact or engagement with the shaft, spindle, or roller $e'$, which latter is turned by rotating the head $e$ until the level $l$ shows that the parts are in equilibrium, whereupon the beam and holder are clamped together by the screw $k$, and the gage $g$ is moved until its index end coincides with zero of the scale on the beam, in which position the gage is clamped by the screw $h$. The article to be weighed being then hung on the hook $o$ or placed on the scale or in the receptacle carried by the hook, the beam is unclamped and moved by turning the head $e$ until the level $l$ again shows equilibrium. The index end of the gage $g$ then coincides with the graduation denoting the net weight of the article weighed, no allowance of tare being required for eliminating the weight of the hook, scale or receptacle.

The lower edge of the beam $a$ may be toothed as a rack gearing with a pinion substituted for the roller $e'$; and, instead of the spirit level, a vertical index may be used pointing to a mark on the standard $s$.

The trestle can be taken apart for packing, by drawing the four legs out of inclined sockets at the ends of the pair of upper bars on which the support $s$ is fixed. When it is convenient to hang the apparatus from a support above, the trestle and support $s$ are dispensed with and a hook, like $o$, inverted, is employed to carry the knife edges $c$.

Having now described the nature of my said invention and the best means I know of carrying the same into practical effect, I claim—

1. The combination in a weighing apparatus, of a standard or support, a rocking holder $b$ provided with beam-supporting rollers $d$ and $d'$ and having knife edges $c$ mounted on the standard or support, a graduated beam $a$ weighted at one end and slidable lengthwise between the said rollers, a rotatable-shaft or spindle $e'$ having engagement with the scale beam and provided with a head by which to turn it for the purpose of moving the beam lengthwise in the holder, and a device hung from the holder for suspending the article to be weighed, substantially as described.

2. The combination in a weighing apparatus, of a standard or support, a rocking-holder having knife edges mounted on the standard or support, a graduated beam movable lengthwise through the rocking-holder, a rotatable-shaft or spindle $e'$ having engagement with the beam and provided with a head by which to turn it for moving the beam lengthwise, a device hung from the rocking-holder for suspending the article to be weighed, a gage $g$ slidable horizontally on the rocking holder, and a device for holding the gage in a fixed position on the holder, substantially as described.

In testimony whereof I have signed my name to this specification, in the presence of two subscribing witnesses, this 28th day of November, A. D. 1893.

ROBERT NESBIT COGHLAN.

Witnesses:
OLIVER IMRAY,
*Chartered Patent Agent, 28 Southampton Buildings, London, W. C.*
JNO. P. M. MILLARD,
*Clerk to Messrs. Abel & Imray, Consulting Engineers and Patent Agents, 28 Southampton Buildings, London, W. C.*